(No Model.)
D. W. KINGSLEY.
APPARATUS FOR TOWING CANAL BOATS.
No. 378,009. Patented Feb. 14, 1888.
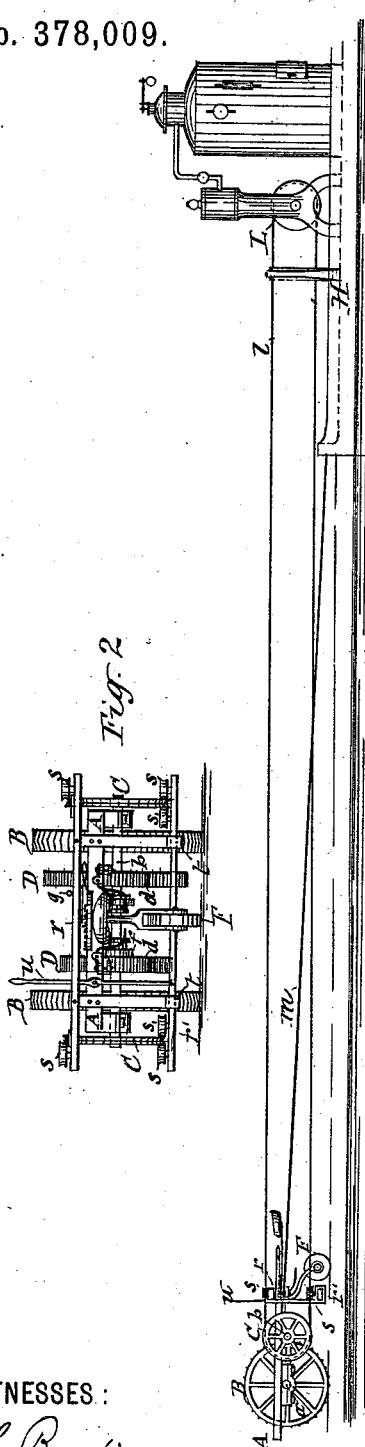
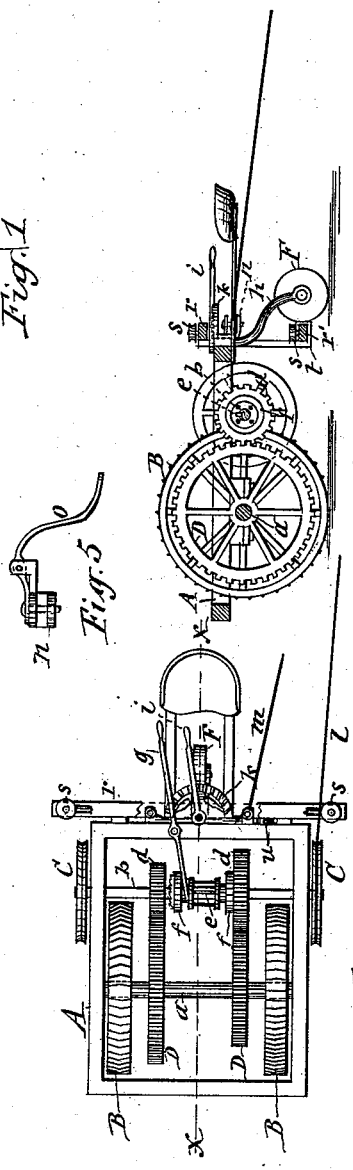
WITNESSES:
INVENTOR
David W. Kingsley
BY
Duell, Laass & Duell
ATTORNEYS

UNITED STATES PATENT OFFICE.

DAVID W. KINGSLEY, OF LIVERPOOL, NEW YORK.

APPARATUS FOR TOWING CANAL-BOATS.

SPECIFICATION forming part of Letters Patent No. 378,009, dated February 14, 1888.

Application filed December 9, 1887. Serial No. 257,397. (No model.)

*To all whom it may concern:*

Be it known that I, DAVID W. KINGSLEY, of Liverpool, in the county of Onondaga, in the State of New York, have invented new and useful Improvements in Apparatus for Towing Canal-Boats, of which the following, taken in connection with the accompanying drawings, is a full, clear, and exact description.

The purpose of this invention is to tow boats by mechanical tractive power applied to the tow-path and driven by a prime motor mounted on the boat, thereby dispensing with the use of horses for the aforesaid purpose and reducing the cost of towing boats, and also obtaining a much greater power than can be derived from a wheel acting upon the water.

In the annexed drawings, Figure 1 is a side elevation of a towing apparatus embodying my invention. Fig. 2 is an enlarged rear end view of the traction truck or carriage. Fig. 3 is a top plan view of the same. Fig. 4 is a vertical longitudinal section on line $x\ x$, Fig. 3; and Fig. 5 is an enlarged detail view of the device for connecting and disconnecting the tow-line with the traction-truck.

Similar letters of reference indicate corresponding parts.

A represents the frame of the traction truck or carriage mounted on the axle $a$ of traction-wheels B B, by which said truck or carriage travels on the tow-path or road along the side of the canal or other water-course. C denotes a driving-pulley, one of which I arrange at each side of the truck, so as to always have the driving-pulley at the side nearest the water-course in going in either direction. Said pulleys may, if desired, be attached to the axle $a$ of the traction-wheels; but I prefer to mount said pulleys on opposite ends of a separate driving-shaft, $b$, journaled in suitable bearings secured to the truck-frame, as illustrated in the annexed drawings.

On the axle $a$, I rigidly secure two gear-wheels, D D, of different diameters, and on the driving-shaft $b$, I mount loosely two pinions, $d\ d$, also of different diameters, the smaller pinion meshing with the larger gear-wheel and the larger pinion with the smaller gear-wheel. On a spline, $e$, on the driving-shaft $b$ slide clutches $f\ f$, which are adapted to engage or interlock with the suitable clutch-faces on the sides of the pinions. The clutches I prefer to couple together, as shown in Fig. 3 of the drawings, so that only one clutch at a time can be thrown into engagement with one of the pinions. A lever, $g$, is pivoted on the frame and connected at one end with one of the clutches for shifting the same.

A steering-wheel, F, is connected to a post, $h$, which is pivoted to the frame A and preferably provided with a hand-lever, $i$, controllable by the attendant of the traction truck or carriage. In connection with said hand-lever I prefer to employ a semicircular ratchet, $k$, on which the lever lies, and by its engagement with the teeth of the ratchet it is held in its adjusted position.

H represents a boat in the canal or other navigable water-course, on which boat I mount the prime motor, preferably of the form of a steam-engine, I, provided with a driving-pulley, L, which is connected with the driving-pulley C on the traction-truck by a suitable driving belt or cable, $l$.

$m$ represents a tow-line connecting the truck or carriage with the boat. The connection of said line to the truck I prefer to make by means of an eye on the end of the line entering a bifurcated head, $n$, secured to the truck-frame A, and a pin passing vertically through the said head and through the eye of the tow-line, and in order to facilitate the disconnection of the tow-line when required I pivot to the side of the head $n$ a lever, $o$, which has one end under the head of the coupling-pin, as shown in Fig. 5 of the drawings.

In operating my invention the engine I is set in motion. This causes the belt or cable $l$ to transmit motion to the driving-shaft $b$ by the pulley C. Then, by throwing one of the clutches $f$ into engagement with one of the pinions $d$, motion is transmitted to the axle $c$ and traction-wheels B B by means of the gear-wheel D in engagement with the aforesaid pinion. The rotation of the traction-wheels propels the truck or carriage and causes the same to draw along the boat H by means of the tow-line $m$. The boat H may be employed for towing other boats. The speed of the traction-truck can be regulated according to the load or number of boats in tow. By throwing the clutch $f$ in gear with the small pinion $d$ the speed is diminished and the power increased, and the converse result is effected by throwing the clutch in gear with the larger pinion.

To properly guide the belt or cable l on the driving-pulley C of the traction-truck, I secure to the truck-frame two transverse bars, r r', on which are pivoted suitable guide-rollers, s s. The lower bar, r', I mount in guides t t, which allow said bar to slide longitudinally. By means of a lever, u, pivoted on the truck-frame A and connected with the bar r' the latter can be shifted so as to compel the inner roller, r, on said bar to throw the belt or cable l off from the pulley when desired.

Having described my invention, what I claim as new, and desire to secure by Letters Patent, is—

1. A boat-towing apparatus consisting of a truck or carriage having traction-wheels mounted on the tow-path, gears on the traction-wheel axle, a driving-shaft meshing with the aforesaid gears and adapted to be thrown in and out of gear, a prime motor mounted on the boat and provided with a driving-pulley, and a belt or cable connecting said two driving-pulleys, substantially as described and shown.

2. The combination of a truck having traction-wheels mounted on the tow-path, a driving-pulley on said truck arranged to transmit motion to the traction-wheels, a steering-wheel connected to a steering-post pivoted to the truck-frame, a prime motor on the boat and provided with a driving-pulley, and a belt or cable connecting said two driving-pulleys, substantially as described and shown.

3. The combination of a truck having traction-wheels mounted on the tow-path, gear-wheels of different diameters fixed to the traction-wheel axle, a driving-shaft on the truck, pinions of different diameters mounted loosely on the driving-shaft and meshing with the aforesaid gear-wheels, clutches sliding on a spline on the driving-shaft and adapted to engage and release the pinions, a driving-pulley on the driving-shaft, a prime motor on the boat provided with a driving-pulley, and a belt or cable connecting the said two driving-pulleys, substantially as described and shown.

In testimony whereof I have hereunto signed my name, in the presence of two witnesses, at Syracuse, in the county of Onondaga, in the State of New York, this 26th day of November, 1887.

DAVID W. KINGSLEY. [L. S.]

Witnesses:
HOWARD P. DENISON,
C. L. BENDIXON.